(12) United States Patent
Huynh

(10) Patent No.: US 8,441,213 B2
(45) Date of Patent: May 14, 2013

(54) BIDIRECTIONAL PHASE CUT MODULATION OVER AC POWER CONDUCTORS

(75) Inventor: Steven Huynh, Fremont, CA (US)

(73) Assignee: Active-Semi, Inc. (VG)

( * ) Notice: Subject to any disclaimer, the term of this patent is extended or adjusted under 35 U.S.C. 154(b) by 366 days.

(21) Appl. No.: 12/803,573

(22) Filed: Jun. 29, 2010

(65) Prior Publication Data

US 2011/0316441 A1    Dec. 29, 2011

(51) Int. Cl.
*H05B 37/02*    (2006.01)

(52) U.S. Cl.
USPC ........ 315/312; 315/291; 315/246; 315/209 R; 315/210

(58) Field of Classification Search .................. 315/312, 315/291, 246, 209 R, 210, 225, 226, 308
See application file for complete search history.

(56) References Cited

U.S. PATENT DOCUMENTS

| | | | |
|---|---|---|---|
| 4,392,086 A | 7/1983 | Ide et al. ........................ | 315/174 |
| 4,449,897 A | 5/1984 | Garrett ........................... | 417/437 |
| 4,797,599 A | 1/1989 | Ference et al. ................. | 315/194 |
| 4,866,350 A | 9/1989 | Counts ....................... | 315/209 R |
| 5,068,576 A | 11/1991 | Hu et al. ........................ | 315/291 |
| 5,101,142 A | 3/1992 | Chatfield ....................... | 315/308 |
| 5,192,896 A | 3/1993 | Qin ................................ | 315/224 |
| 5,691,605 A | 11/1997 | Xia et al. ....................... | 315/307 |
| 5,872,429 A | 2/1999 | Xia et al. ....................... | 315/194 |
| 2006/0284728 A1 | 12/2006 | Rubinstein et al. ........... | 362/640 |
| 2010/0060187 A1* | 3/2010 | Newman et al. ............... | 315/291 |

* cited by examiner

*Primary Examiner* — Daniel D Chang
(74) *Attorney, Agent, or Firm* — Imperium Patent Works; T. Lester Wallace; Darien K. Wallace

(57) ABSTRACT

A system includes a controller and line units. The controller receives AC power from a power source and supplies an AC power signal via two conductors to the units. In one example, the controller is a dimmer switch and the units are intelligent LED lamps. The controller uses phase cut modulation to communicate information (for example, lighting control commands) to the units. The units receive the AC power signal, demodulate and recover the phase cut modulated information, and optionally communicate information back to the controller using load modulation. An addressed unit changes loading on the two conductors from phase cut time to phase cut time, thereby modulating information onto the AC power signal. The controller monitors the AC power signal, and demodulates and recovers the information. The overall bidirectional communication is referred to as bidirectional phase cut modulation over AC power conductors. Units can be controlled individually or in groups.

13 Claims, 14 Drawing Sheets

AS OUTPUT FROM CONTROLLER

PHASE CUT TIMES

AFTER BRIDGE RECTIFIER INSIDE LED LAMP LINE UNIT

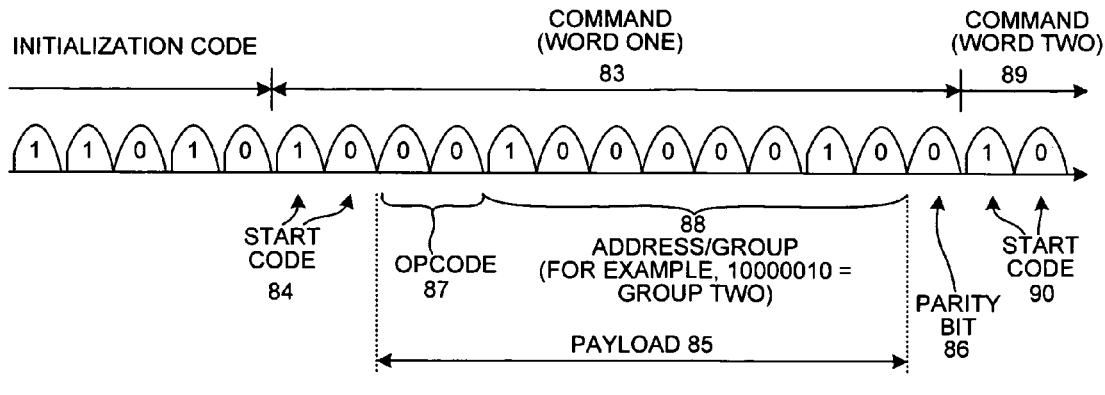
FIG. 9
| OPCODE | | MEANING |
|---|---|---|
| 0 | 0 | SET LIGHT LEVEL |
| 0 | 1 | ENTER PROGRAM MODE |
| 1 | 0 | EXIT PROGRAM MODE |
| 1 | 1 | REPORT BACK |
FIG. 10
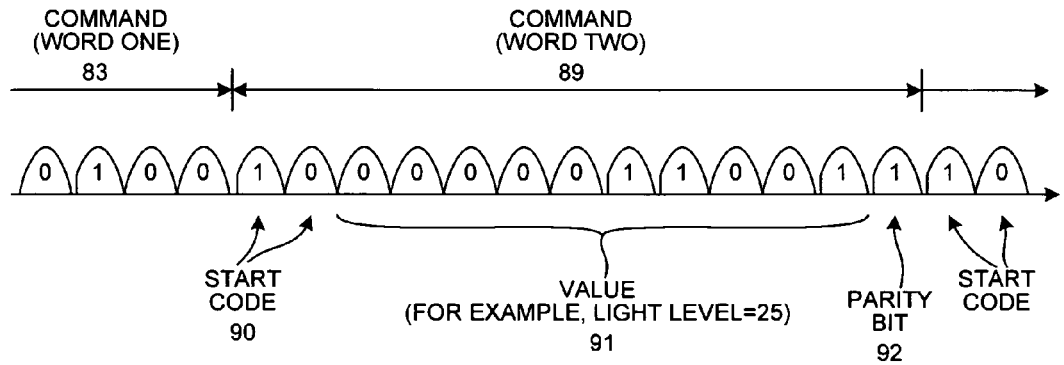
FIG. 11

LED LAMP LINE UNIT

THE ADDRESSED LAMP LINE UNIT REPORTS
BACK DURING THE PHASE CUT TIME - "1" BIT

PROGRAM AN UNPROGRAMMED
LAMP LINE UNIT

REPROGRAM A PROGRAMMED
LAMP LINE UNIT

BIDIRECTIONAL PHASE CUT MODULATION OVER AC POWER CONDUCTORS

TECHNICAL FIELD

The present disclosure relates generally to bidirectional phase cut modulation communication of information over AC power conductors.

BACKGROUND INFORMATION

FIG. 1 (Prior Art) is a circuit diagram of a system of ordinary electric incandescent lamps or light bulbs 1-6 such as might be found in a building. A pair of conductors 7 and 8 extends into a wall box 9. These conductors are designated as the AC live conductor 7 (also referred to as the AC line conductor) and an AC neutral conductor 8. This pair of conductors is usually sheathed together in a common insulator where it extends through the walls of the building. A second set of conductors 10 and 11 extends from the wall box to the electric lamps (also commonly referred to as "lights"). The conductors 7, 8, 10 and 11 generally represent an installed wiring infrastructure of the building. These conductors are embedded in walls and ceilings and are difficult to replace or modify.

A dimmer switch 12 is provided in the wall box. Dimmer switch 12 includes a manual paddle switch 13 (also referred to as a rocker switch) that can be manipulated by a person to turn off and to turn on the lights. Dimmer switch 12 also includes a slider 14 (using a sliding adjustable resistor) that can be manipulated by a person to adjust the brightness of the lights. Dimmer switch 12 has terminals 15 and 16 for connecting the dimmer switch to conductors 10 and 7, respectively. In the illustrated example the terminals 15 and 16 are wires but in other examples the terminals 15 and 16 may be screw clamping mechanisms or insertion fit mechanisms. Terminal 15 is connected to conductor 10 via twist-on wire connector 18. Terminal 16 is connected to conductor 7 via twist-on connector 17. A third twist-on wire connector 19 connects the neutral conductor 8 to the neutral conductor 11 extending to the lights. The dimmer switch is of a form factor that fits into, and attaches to, the wall box 9. A face plate 20 is secured over the installed dimmer switch.

Such dimmer switches typically involve a bidirectional AC switch such as a TRIAC (triode for alternating current) that can selectively break and make the AC live connection that extends to the lights. If the lights are to be off, then the TRIAC is controlled to be nonconductive such that the AC live connection to the lights is broken. AC power to the lights is cut and the lights are not on. If the lights are to be on, then the TRIAC is controlled to be conductive. The AC live connection to the lights is in tact, AC power flows to the lights, and the lights are on.

If the lights are to be dimmed, however, then the TRIAC is made to be nonconductive during only a portion of each cycle of the AC signal. Typically, the TRIAC is controlled to be off starting at the time when the AC power signal is at zero degrees in its sinusoidal wave. At the time of zero degrees, the voltage between conductors 7 and 8 is zero volts. The TRIAC is controlled to remain off for an amount of time as the voltage between conductors 7 and 8 increases from zero volts. The voltage difference between conductors 7 and 8 increases, but due to TRIAC being nonconductive the AC live connection to the lights is broken and power does not flow to the lights during this time. Then at some period of time later, the TRIAC is controlled to be conductive. The AC power connection to the lights is reestablished. This condition persists with power flowing to the lights until the phase of the AC power signal on conductors 7 and 8 reaches one hundred eighty 180 degrees. At this point the voltage between the conductors 7 and 8 is decreasing and crosses zero volts again. The TRIAC is controlled to turn off and to remain off for an amount of time as the voltage between conductors 7 and 8 goes negative. Then at some period of time later, the TRIAC is controlled to be conductive so that the AC power connection to the lights is reestablished.

In this way, the TRIAC is made to break the AC electrical circuit to the lights during portions of time following the zero-crossings of the AC power signal at zero degrees and at one hundred eighty degrees. The overall amount of energy supplied to the lights over the time of a cycle of the AC power signal depends on how long the TRIAC remains nonconductive following these zero-crossings. The longer the times, the less energy is supplied to the lights over the cycle, and the dimmer the lights are. The shorter the times, the more energy is supplied to the lights over the cycle, and the brighter the lights are. By manipulating slider 14, a person can adjust the times, and thereby adjust the proportion of the AC power cycle that the TRIAC is nonconductive, and thereby adjust the brightness of the lights. Such a dimmer switch typically includes a microcontroller that detects the zero-crossings of the AC power signal, that detects the position of the paddle switch 13 and the slider 14, and that controls the TRIAC accordingly. Ways of improving the functionality of the conventional lighting system in ways that exploit the already installed wiring infrastructure are desired.

SUMMARY

A system includes a controller and a number of line units. The controller receives AC power from a power source (for example, from AC mains) and supplies an AC power signal via two conductors to the line units. The line units are connected in parallel between the two conductors. In one example, the controller is a dimmer switch, the line units are intelligent LED lamps, one of the two conductors is an AC neutral conductor, and the other of the two conductors is a switched AC live conductor. The controller uses phase cut modulation to communicate information (for example, lighting control commands) to the line units. The line units receive the AC power signal, demodulate and recover the phase cut modulated information, and optionally communicate information back to the controller using load modulation. The overall bidirectional communication is referred to as bidirectional phase cut modulation over AC power conductors.

The information communicated from the controller to the line units can include a command that contains an address. The address indicates which line unit or line units is/are the intended recipient or recipients of the command. Each line unit stores a unique address that identifies the line unit. This unique address may, for example, be programmed into the line unit at the time of manufacture. Each line unit may also store a group address that indicates a group of line units to which the line unit belongs. The group address may be programmed into the line unit by the user in the field. Using commands in combination with these addresses allows the line units to be individually addressed or to be addressed in groups.

In one example, the address in a command is used to address and control a selected individual line unit separate from other line units. The command includes an opcode that defines the command to be a report back command. The report back command instructs the addressed line unit to report back information to the controller in a defined report back word time that follows the command. In response to receiving the report back command from the controller, the addressed line unit changes loading on the two conductors from phase cut time to phase cut time during the report back word time, thereby load modulating information onto the AC power signal. The controller monitors the AC power signal during the report back word time, and demodulates and recovers the information. In this way the controller commands an individual line unit to report back information to the controller.

The bidirectional phase cut modulation described here allows line units to be controlled in multiple groups even though all the line units are receiving AC power and commands via the same two AC power conductors. In one example, the controller includes a first switch and/or slider for controlling a first group of units and also includes a second switch and/or slider for controlling a second group of units. When a user manipulates one of the switches or sliders, the controller sends out a command to all the line units. The address in the command is a group address associated with the switch or slider that the user manipulated. If, for example, the command is a command to change the brightness setting and the user manipulated a slider for the first group of lamp line units, then the command includes a group address associated with the first group of lamp line units. All of the lamp line units receive the command and check the group address contained in the command, but only those lamp line units that have been programmed to be associated with the group address of the first group respond to the command and change their brightness settings. The lamp line units of other groups do not change their brightness settings. In this way, the first switch/slider on the controller can be used to control a first group of lamp line units and the second switch/slider on the controller can be used to control a second group of lamp line units. The user can control the two groups of lamp line units separately from the two sets of switches/sliders on the controller even though all the lamp line units receive AC power and commands from the controller via the same two conductors.

In addition, methods are described below for programming an individual line unit so that it will be associated with a particular group address. A method is also described by which the controller can discover the addresses of the line units connected to the AC power conductors. The foregoing is a summary and thus contains, by necessity, simplifications, generalizations and omissions of detail; consequently is it appreciated that the summary is illustrative only. Still other methods, and structures and details are set forth in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 9 is a waveform diagram that illustrates the first word of a two-word command sent by the controller.

FIG. 10 is a table that sets forth the meaning of an opcode of the first word of a two-word command.

FIG. 11 is a waveform diagram that illustrates the second word of a two-word command sent by the controller.

DETAILED DESCRIPTION

Figure 1:
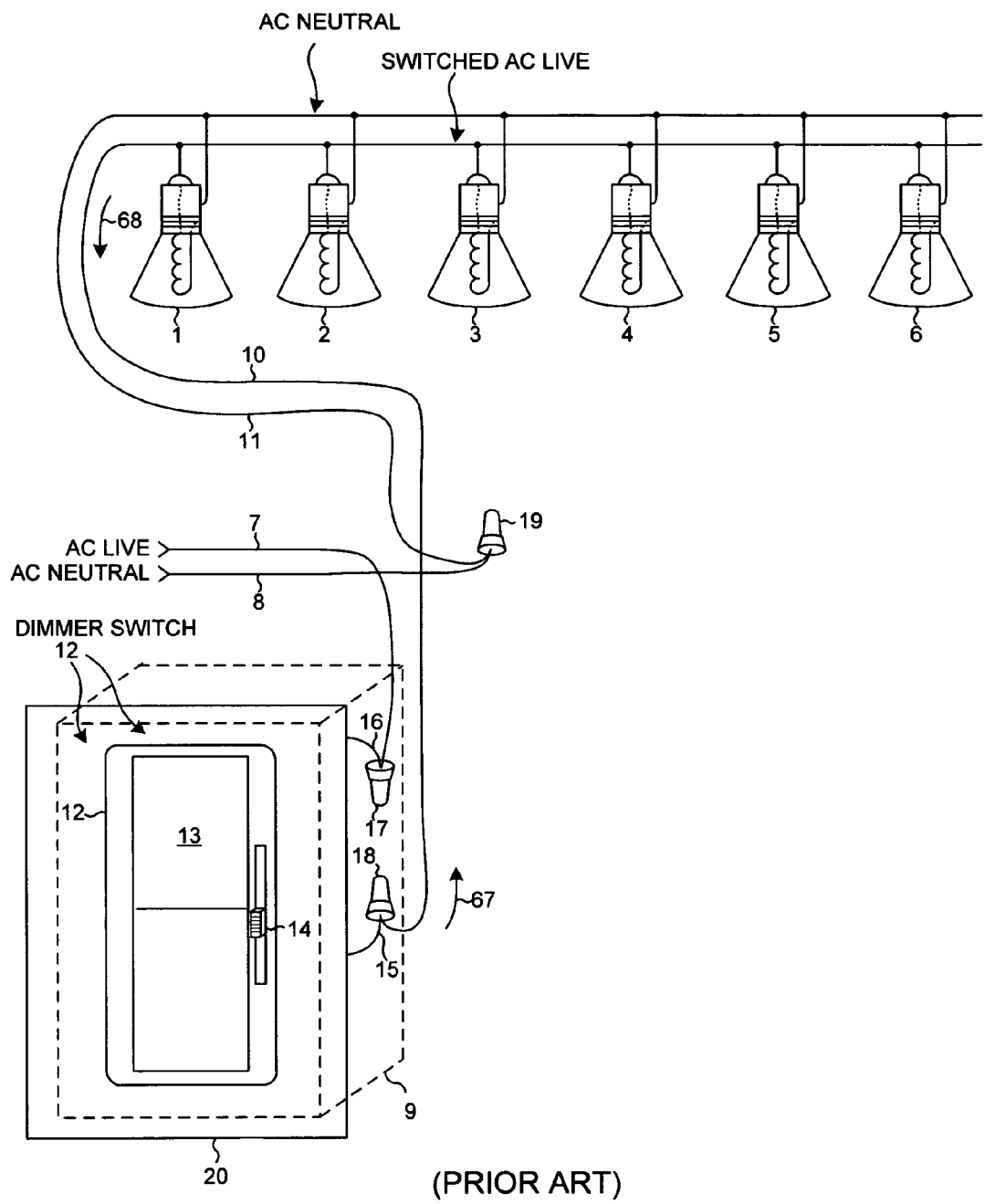
FIG. 1 (Prior Art) is a circuit diagram of a system of ordinary conventional electric incandescent lamps or light bulbs such as might be found in a building.
Figure 2:
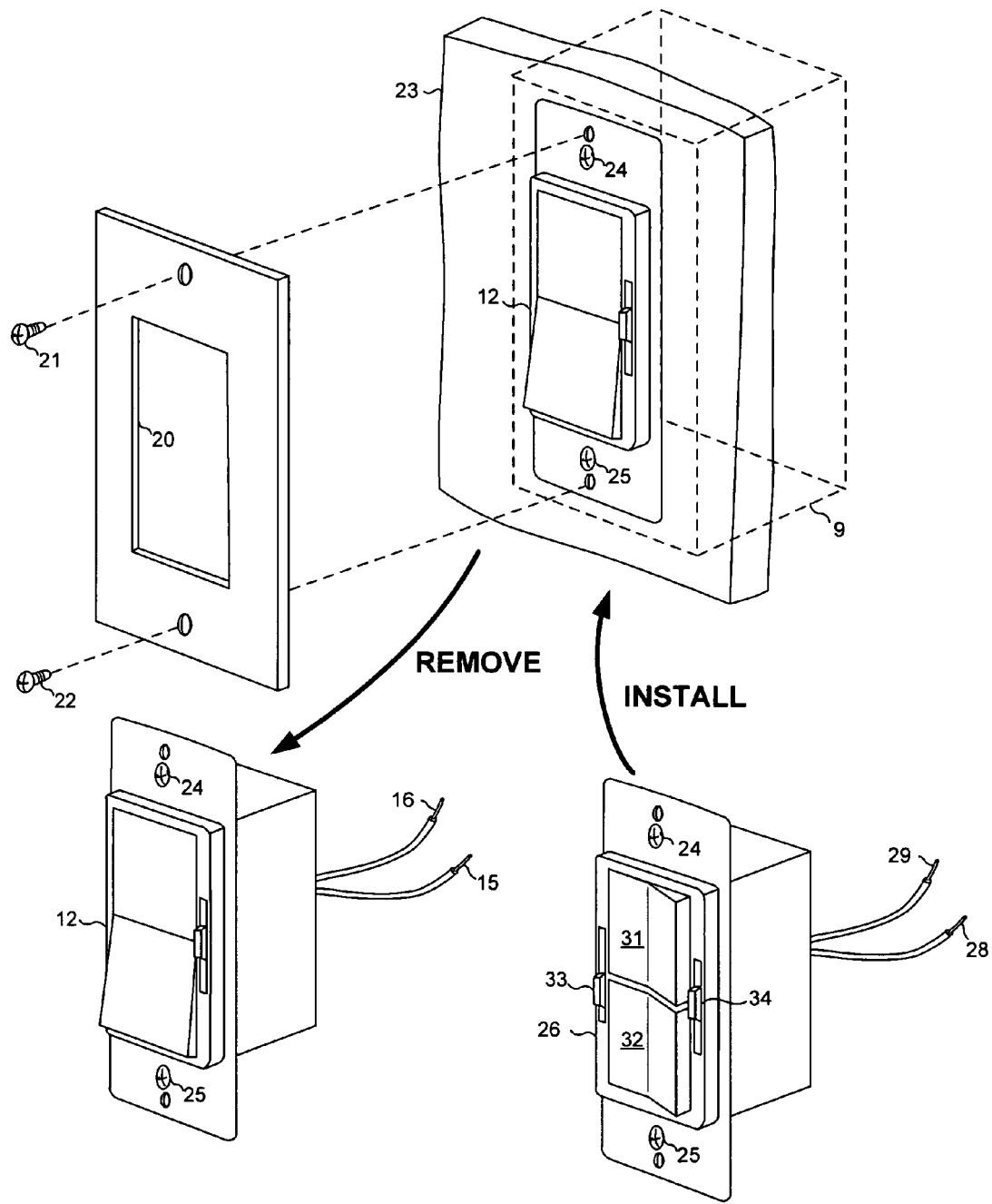
FIGS. 2 and 3 illustrate steps of upgrading the conventional lighting system of FIG. 1 so that the conventional dimmer switch of FIG. 1 and the conventional incandescent lamps of FIG. 1 are replaced with devices that communicate using bidirectional phase cut modulation.
Figure 3:
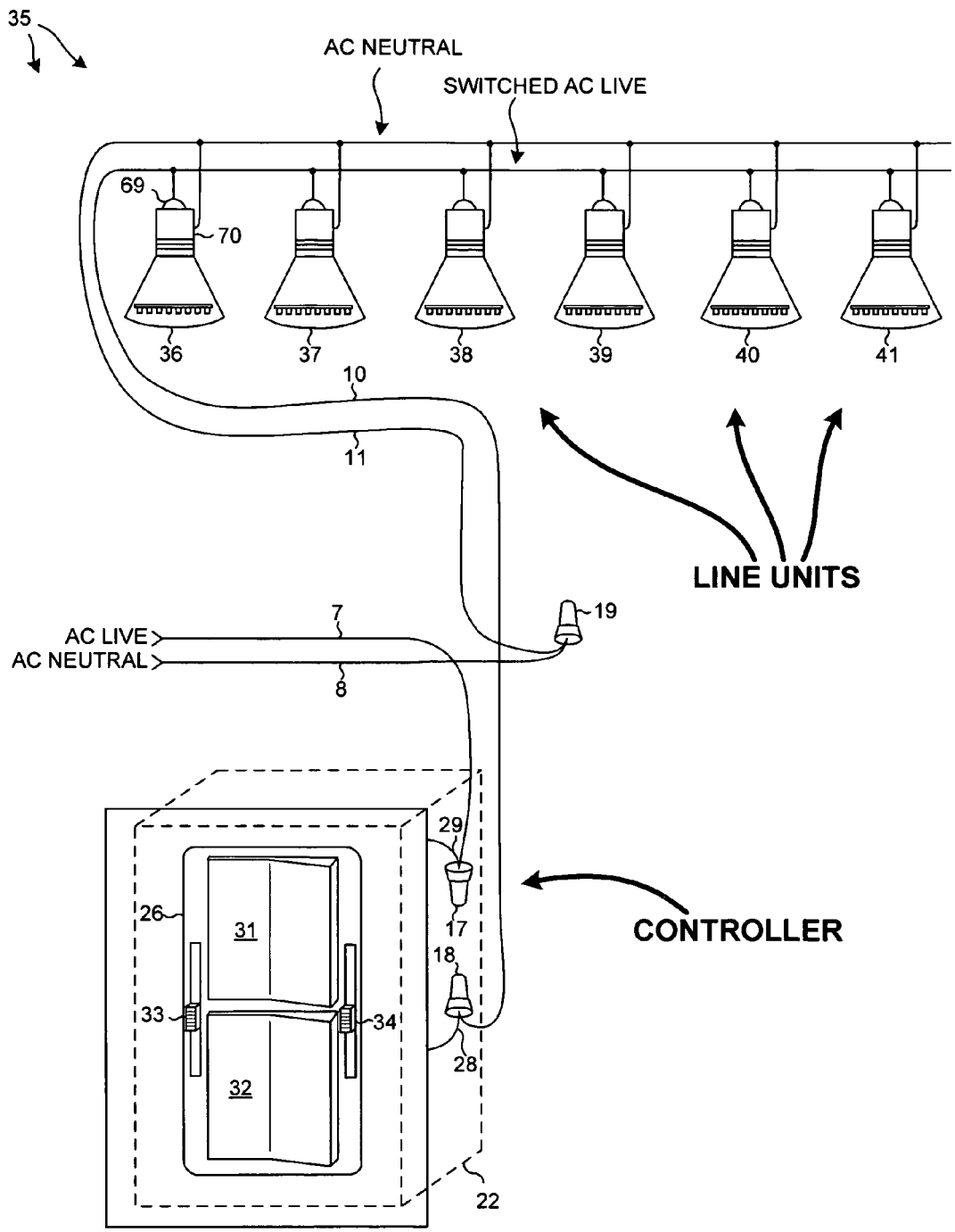

FIGS. 2 and 3 illustrate steps of upgrading a lighting system such as the conventional lighting system of FIG. 1 that includes an installed wiring infrastructure. Screws 21 and 22 are removed so that the wall plate 20 can be removed from the conventional dimmer switch 12. Reference numeral 23 identifies the surface of the wall that is flush with the rectangular opening of the wall box 9. Next, screws 24 and 25 are removed so the conventional dimmer switch 12 can be pulled out of the wall box. The twist-on connectors 17 and 18 (see FIG. 1) are unscrewed to disconnect the conventional dimmer switch 12 from conductors 10 and 7. Conductors 10 and 7 are not shown in FIG. 2. After conventional dimmer switch 12 has been removed from the wall box and has been disconnected from the conductors 10 and 7, then a novel dimmer switch 26 is installed. Twist-on connector 17 is used to connect AC live terminal 29 to AC live conductor 7. Twist-on connector 18 is used to connect switched AC live terminal 28 to conductor 10. Terminals 28 and 29 in this example are the ends of wire conductors as illustrated. In other examples, the terminals 28 and 29 are clamping screws or insertion fit mechanisms or another suitable mechanism for connecting dimmer switch 26 to conductors 10 and 7.

In contrast to the conventional dimmer switch 12 that was removed, the novel dimmer switch 26 has two paddle switches 31 and 32 and two sliders 33 and 34. Once the new dimmer switch 26 is connected to conductors 10 and 7, the dimmer switch 26 is inserted into wall box 9. The dimmer switch 26 is secured in place by replacing screws 24 and 25. The wall plate 20 is then replaced and is secured in place by replacing screws 21 and 22. Twist-on connector 19 is not disturbed and remains in place connecting AC neutral conductor 8 to neutral conductor 11.

FIG. 3 is a diagram that shows the lighting system 35. In addition to replacing dimmer switch 12 with novel dimmer switch 26, the conventional incandescent lamps 1-6 of FIG. 1 are replaced with novel intelligent LED (Light Emitting Diode) lamps 36-41. In this example, each of the LED lamps has the same screw-in connector form as the conventional incandescent bulbs 1-6. Consequently an incandescent bulb can be unscrewed and removed from its socket and a new LED lamp can be screwed into the same socket in an easy replacement operation. As is explained in further detail below, the dimmer switch 26 is capable of bidirectional communication with the LED lamps 36-41 via a conductor over which AC power is supplied to the lamps 36. The conductor is the switched AC live conductor and involves terminal 28, twist-on connector 18 and conductor 10. As is explained in further detail below, the dimmer switch 26 sends first information 67 to the lamps 36-41 using phase cut modulation and an addressed one of the lamps 36-41 sends second information 68 back to the dimmer switch 26 using load modulation.

Figure 4:
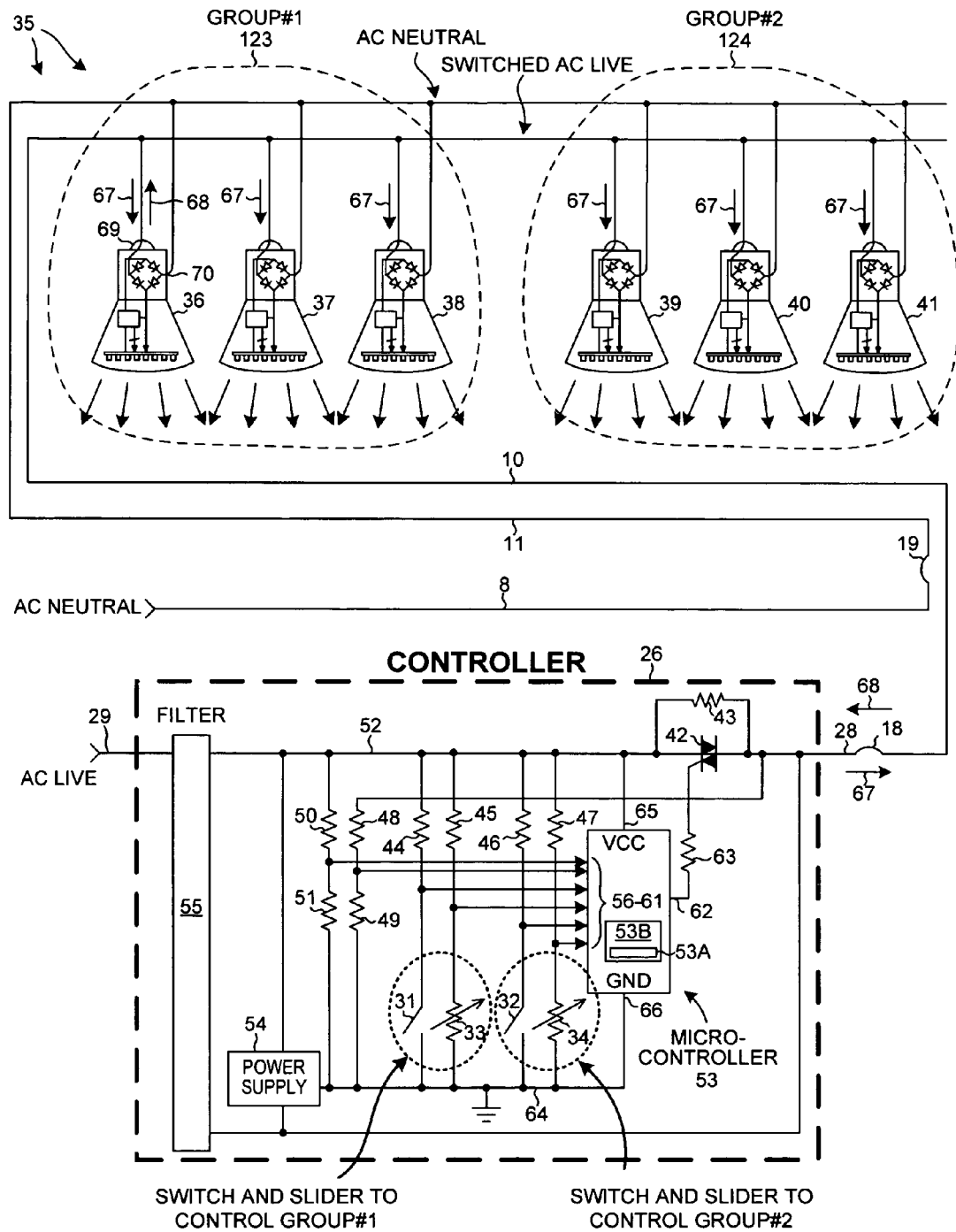
FIG. 4 is a more detailed diagram of the novel lighting system 35 of FIG. 3.

FIG. 4 is a more detailed diagram of the lighting system 35 of FIG. 3. Dimmer switch 26 is referred to more generically here as a controller. Whereas in the specific example being illustrated the controller is a dimmer switch located in a wall box, the controller need not be a dimmer switch and need not be located in a wall box. The controller is a general purpose communication mechanism for communicating with remote line devices via an AC power conductor. Similarly, whereas in the specific example being illustrated the remote line units are LED lamps 36-41, the line units need not be lamps and need not be located in lamp sockets. A line unit can have one of many different functions. Moreover, not all the line units in the system 35 must have the same function. Rather, a line unit is a general purpose communication mechanism for communicating with a controller via the AC power conductor 28, 18 and 10.

In the specific example of FIG. 4 where the controller is dimmer switch 26, the controller 26 includes first terminal 28, second terminal 29, a TRIAC 42, a sense resistor 43, paddle switch 31, slider 33, paddle switch 32, slider 34, and set of pull up resistors 44-47, a voltage divider involving resistors 48 and 49 to sense the voltage on terminal 28, a voltage divider involving resistors 50 and 51 to sense zero-crossings of the AC power signal on node 52, a microcontroller 53, a power supply circuit 54 and a filter 55. In one example, the input terminals 56-61 of the microcontroller 53 are all multiplexed onboard the microcontroller to the input of an analog-to-digital converter (ADC). By the use of this ADC, microcontroller 53 monitors and determines the positions of paddle switches 31 and 32, sliders 33 and 34, and determines the voltage on terminal 28. Microcontroller 53 includes a zero-crossing comparator, an input of which is coupled to the center tap of the voltage divider involving resistors 50 and 51. Microcontroller 53 controls TRIAC 42 by driving the gate of the TRIAC via output terminal 62 and resistor 63. Microcontroller 53 executes a program of processor-executable instructions 53A stored in a processor-readable medium (memory) 53B within the microcontroller. Power supply circuit 54 has a first input that is coupled to node 52 and a second input that is coupled to terminal 28. Power supply circuit 54 regulates the voltage on ground conductor 64 such that a DC supply voltage is present between the supply voltage terminal 65 of the microcontroller and the ground terminal 66 of the microcontroller. Arrows 67 in FIG. 4 represents the first information that is phase cut modulated and that is output from controller 26 via terminal 28 and that passes across conductor 10 to the first terminals of the lamps 36-41. The first terminal of lamp 36 is identified in FIG. 4 by reference numeral 69. Arrows 68 in FIG. 4 represents the second information that is load modulated and that passes out of second terminal 70 of lamp 36, passes across conductor 10 in an opposite direction to the direction that first information 67 passed, and passes into controller 26 via terminal 28. All of the lamps 36-41 receive the first information 67 but only one addressed lamp responds by sending back the second information 68.

Figure 5:
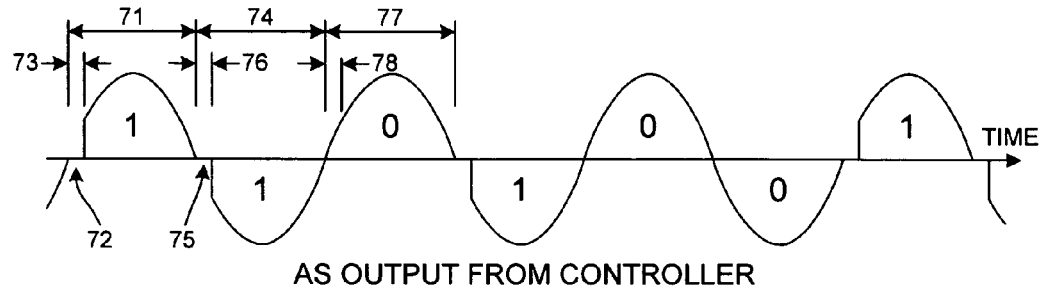
FIG. 5 is a simplified waveform diagram that illustrates how the AC power signal as supplied by the controller of FIG. 3 to the lamps of FIG. 3 carries phase cut modulated information.

FIG. 5 is a simplified waveform diagram that illustrates how the AC power signal as supplied by controller 26 via terminal 28 and conductor 10 to the lamps 36-41 carries the phase cut modulated first information 67. Each cycle of the AC power signal between the AC live conductor 7 and the AC neutral conductor 8 involves two half cycles, where each half cycle starts with a zero-crossing event in which the voltage of the AC sinusoidal signal reaches zero volts. If a digital one is to be transmitted, then the TRIAC is turned off upon this initial zero crossing event and is left off for an amount of time. This time is referred to here as the "phase cut time" or the "phase disruption time". This time is roughly thirty degrees of the period of the AC power signal. After this phase cut time has expired, then the TRIAC is made to be conductive. The voltage on terminal 28 returns to the instantaneous voltage of the AC power signal present on AC live input terminal 29. From this time until the time of the next zero-crossing event, the voltage waveform of the signal on terminal 28 is the same as the voltage waveform of the original AC power signal on AC live input terminal 29. The "phase cut" at the beginning of the half cycle indicates that a digital one has been encoded onto the signal.

If, on the other hand, a digital zero is to be transmitted, then the TRIAC is controlled to remain on through the duration of the half cycle. Accordingly there is no "phase cut" at the beginning of the half cycle during the phase cut time. The voltage waveform of the signal on terminal 28 is the same as the voltage waveform of the original AC power signal on AC live input terminal 29. The lack of a "phase cut" during the phase cut time of the half cycle indicates that a digital zero has been encoded onto the signal.

In the example of FIG. 5, the first half cycle 71 includes a phase cut 72 during phase cut time 73. The voltage on terminal 28 during the phase cut time is approximately zero volts. The first half cycle 71 therefore carries a digital one as indicated by the "1" appearing under the waveform. Similarly, the second half cycle 74 also has a phase cut 75 during its phase cut time 76. The second half cycle 74 therefore also carries a digital one as indicated by the "1" appearing under the waveform. The third half cycle 77, however, includes no phase cut during its phase cut time 78. The third half cycle 75 therefore carries a digital zero as indicated by the "0" appearing under the waveform.

Figure 6:
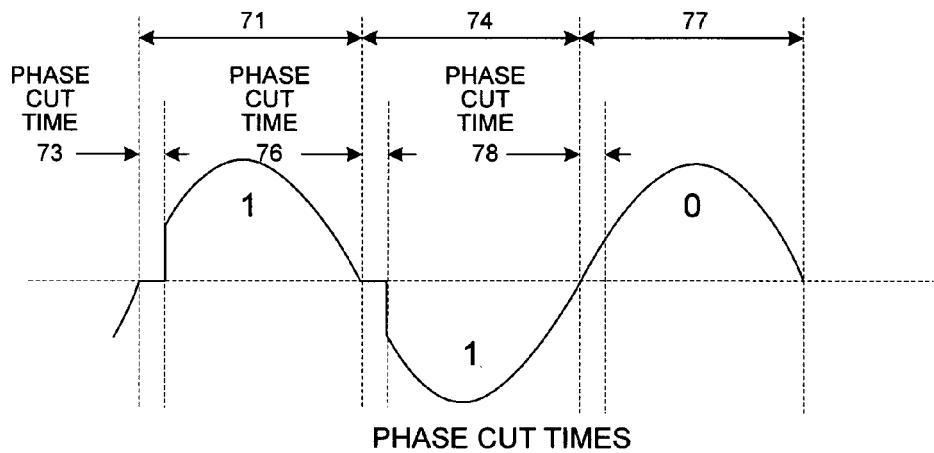
FIG. 6 is a waveform diagram that shows three half cycles of the waveform of FIG. 5 in further detail.

FIG. 6 is a waveform diagram that shows the three half cycles 71, 74 and 77 in further detail. The phase cut time (also called the phase disruption time) in this example is a fixed amount of time equal to approximately thirty degrees of the period of the sinusoidal AC power signal.

Figure 7:
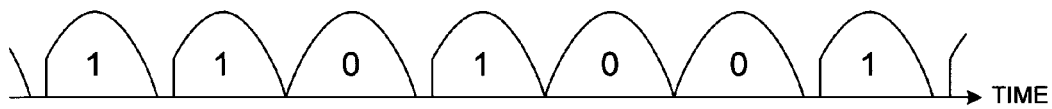
FIG. 7 is a waveform diagram that illustrates the phase cut modulated AC power signal within a lamp after the signal has been rectified in a line unit.

The phase cut modulated signal as output by controller 26 onto terminal 28 passes across conductor 10 and into lamps via their AC live terminals. The signal is rectified by a bridge rectifier and the rectified signal is then analyzed by a dimming decoder circuit within the lamp. FIG. 7 is a waveform diagram that illustrates the phase cut modulated first information within lamp 36 after the signal has been rectified. Half cycles that include phase cuts are determined to be carrying digital "1" information whereas half cycles that do not include phase cuts are determined to be carrying digital "0" information. When information is not being communicated from controller 26 to lamps 36-41 then TRIAC 42 remains on and phase cutting is not performed. The sinusoidal shape of the AC power signal supplied to the lamps 36-41 is not distorted. Any dimming of the light output of the lamps 36-41 is performed by the lamps from energy received by the undistorted AC power signal supplied to the lamps via conductors 10 and 11. Rather than constantly phase-cutting the power signal supplied to lamps in order to reduce power supplied to the lamps in order to provide a dimming function, a dimming command only need be sent once to the lamps using the phase cut modulation. The lights receive the command to perform dimming, and then perform and control the dimming operation locally while receiving undistorted AC power via conductors 10 and 11. The only time the AC power signal as supplied to the lamps is distorted and phase cut is when information must be communicated across conductor 10.

Figure 8:
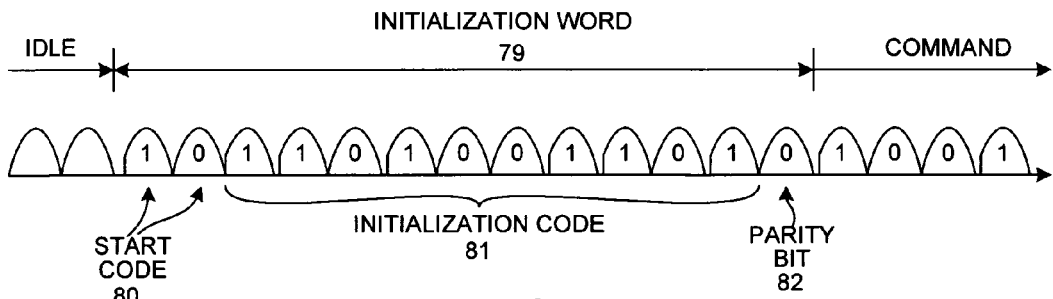
FIG. 8 is a waveform diagram that illustrates an initialization word that is sent by the controller prior to sending a two-word command.

FIG. 8 is a waveform diagram that illustrates an initialization word 79 that is sent by controller 26 prior to sending a two-word command. The waveform of FIG. 8 represents the rectified AC power signal after the bridge rectifier within each of the lamps. As mentioned above, when information is not being communicated across conductor 10, the sinusoidal shape of the AC power signal is not distorted. Such operation is referred to here as the "IDLE" condition. Note at the left of FIG. 8 that the rectified sinusoidal waveform is undistorted and includes no phase cuts during this IDLE time. The initialization word 79 includes two start bits 80, followed by a ten-bit initialization code "1101001101" 81, and followed by an odd parity bit 82. The lamps 36-41 receive and detect this initialization code and prepare themselves to receive a legitimate two-word command.

FIG. 9 is a waveform diagram that illustrates the first word 83 of the two-word command. As in the case of the initialization word, the first word 83 of the command includes two start bits 84, a ten-bit payload 85, and one odd parity bit 86. The ten-bit payload 85 includes a two-bit opcode portion 87 and an eight-bit address/group portion 88. Each lamp has an address. If a command is intended for a particular lamp then the command will include in its address field 88 of the first word of the command the address of the lamp. In this way, commands are directed to individual lamps. If a lamp receives a command that is not intended for the lamp as indicated by the address field of the command, then the lamp ignores the command. Certain address values are directed to groups of lamps. For example, address "10000000" is a wildcard address that addresses all lamps. Address "10000010" is an address that addresses all lamps of a "Group Two" of lamps. Address "10000001" is an address that addresses all lamps of a "Group One" of lamps. As is explained in further detail below, a lamp can be assigned to be a member of a group of lamps. After such an assignment, all lamps of the group can be made to take a particular action by sending all the lamps a command using the address for the group. (Although only eight-it addresses are described in the simplified illustrative example, in a real system addresses are substantially longer and involve bits in several successive command words.)

FIG. 10 is a table that sets forth the meanings of the four possible values of the two-bit opcode field 87. Opcode "00" indicates that the command is a command to an addressed lamp to set its brightness level to a brightness value as indicated by the 10-bit value field in a second word of the two-word command. Opcode "01" indicates that the command is a command to an addressed lamp to enter a program mode. Opcode "10" indicates that the command is a command to an addressed lamp to exit the program mode. Opcode "11" is a command to an addressed lamp to report information back to the controller 26. In the case of the report back command, the bits in a ten-bit value field in a following command word indicate the particular type of report back command. As indicated above, the information is reported back using load modulation.

FIG. 11 is a waveform diagram that illustrates the second word 89 of a two-word command. The second word 89 includes two start bits 90, the ten-bit value field 91, and an odd parity bit 92. The meaning of the value in the value field 91 depends on the opcode.

Figure 12:
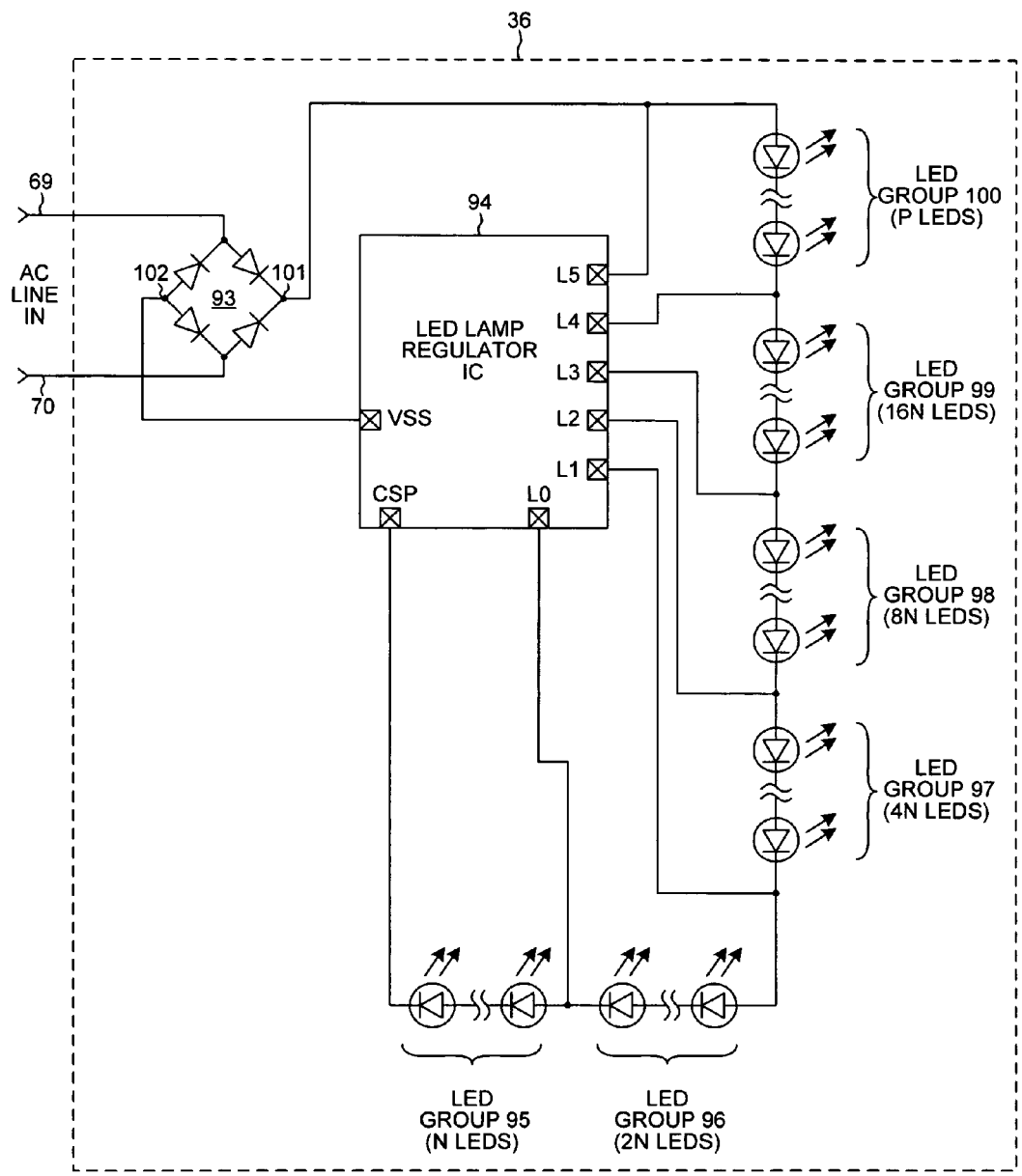
FIG. 12 is a simplified circuit diagram of one of the lamp line units of the system of FIG. 3.

FIG. 12 is a circuit diagram of lamp 36 of FIG. 4. In the illustrated example, all lamps 36-41 are of identical construction. Lamp 36 includes terminals 69 and 70, a bridge rectifier 93, an LED lamp regulator integrated circuit 94, and six groups of white LEDs 95-100. As the voltage of the rectified AC power signal across nodes 101 and 102 changes, the LED lamp regulator IC 94 switches more or fewer LEDs into a string of LEDs where current flows from node 101, through the string of LEDs, and to node 102. The number of LEDs in the sting of LEDs is controlled to keep the current flow within a desirable current range.

Figure 13:
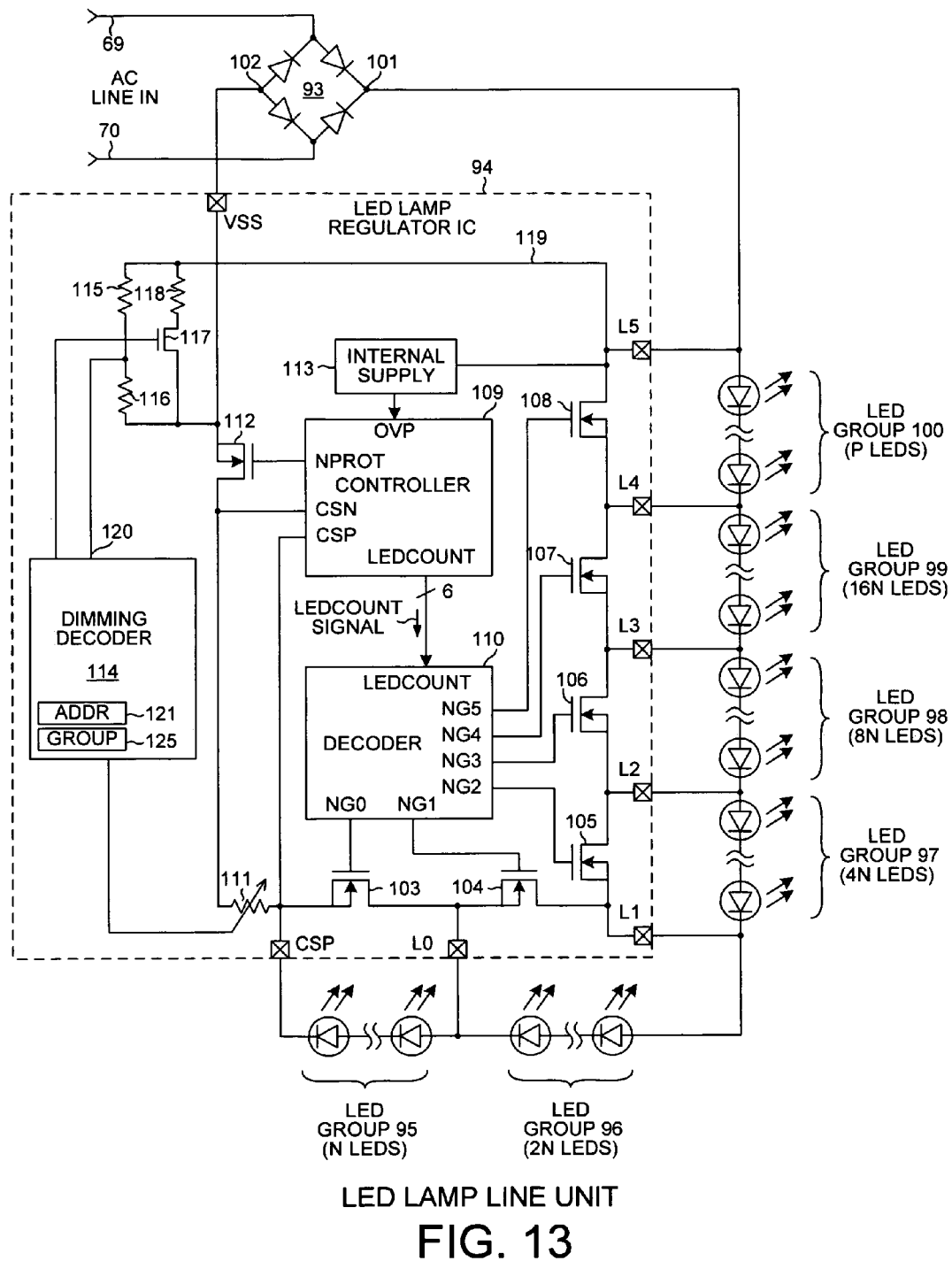
FIG. 13 is a more detailed circuit diagram of the lamp line unit of FIG. 12.

FIG. 13 is a more detailed diagram of lamp 36. The power switches 103-108 are provided so that selected ones of the groups 95-100 of LEDs can be switch into and out of the LED string. A controller 109 and a decoder 110 control current flow through the LED string by monitoring the voltage drop across sense resistor 111 in the LED string current path. Power switch 112 is provided for protection purposes. Internal supply 113 provides a supply voltage used by logic and circuitry within blocks 109 and 110. For additional information on the LED lamp regulator integrated circuit 94 and its operation, see: U.S. Pat. No. 8,299,724, entitled "AC LED Lamp Involving An LED String Having Separately Shortable Sections" (the subject matter of which is incorporated herein by reference).

LED lamp regulator integrated circuit 94 further includes a dimming decoder 114, a voltage divider involving resistors 115 and 116, a switch 117 and a load resistor 118. Dimming decoder monitors the rectified AC power signal present on node 101 via terminal L5, conductor 119, the voltage divider involving resistors 115 and 116, and input 120. From the signal on input 120, dimming decoder 114 determines whether each rectified half cycle of the AC power signal on node 101 has a phase cut or does not have a phase cut. After converting the incoming stream of rectified half cycles into corresponding digital "1" and "0" values, the dimming decoder 114 detects and decodes any identified initialization words and command words. In one example, dimming decoder 114 includes a microcontroller. The microcontroller executes a program of processor-executable instructions stored in a processor-readable medium (memory) within the microcontroller. In another example, dimming decoder 114 is an amount of dedicated circuitry that receives and decodes the phase cut modulated first information. Block 121 represents the storage in dimming decoder 114 of the address of the lamp 36. Address 121 is a unique address that uniquely identifies the lamp 36 from all other lamps and that is programmed into the lamp 36 at the time of lamp manufacture. As explained above, lamp 36 only responds to a command if the command contains an address that indicates that the lamp is an intended recipient of the command.

If the incoming command is the "report back" command, then controller 26 follows the command by phase cutting a predetermined number of following half cycles of the AC power signal supplied to the lamps via terminal 28. During the time of a phase cut, the TRIAC 42 in the controller 26 is off. The AC signal from AC live terminal 29 is only weakly coupled to the switched AC live terminal 28 through the resistor 43 that is in parallel with TRIAC 42. Accordingly, if there were no load or only a very small load on conductor 10 and terminal 28 during a phase cut time, then the weak coupling of terminal 28 through the resistor 43 to AC live input terminal 29 would be adequate to cause the voltage signal on terminal 28 and on conductor 10 to follow the voltage waveform of the AC power signal on the AC live input terminal 29 to the controller 26. If, however, there were a substantial load on conductor 10 and terminal 28 during a phase cut time, then the weak coupling of terminal 28 through the resistor 43 to AC live input terminal 29 would be inadequate to overcome the load and to cause the voltage signal on terminal 28 and on conductor 10 to follow the voltage waveform of the AC power signal on AC live input terminal 29. To report second information back to controller 26 following the report back command, the addressed lamp load modulates information onto the AC power signal on conductor 10 by selectively placing a load or not placing a load between terminals 69 and 70 of the lamp during the phase cut times that follow the report back command. If the load is present between terminals 69 and 70 of the lamp, then the voltage of the AC power signal on conductor 10 during the phase cut time will collapse to approximately zero volts. If, however, the load is not present between terminals 69 and 70 of the lamp, then the voltage of the AC power signal on conductor 10 will more closely match a sinusoidal wave shape. Controller 26 can detect this difference in wave shape, from half cycle to half cycle, and thereby receive load modulated information from the addressed lamp.

Figure 14:
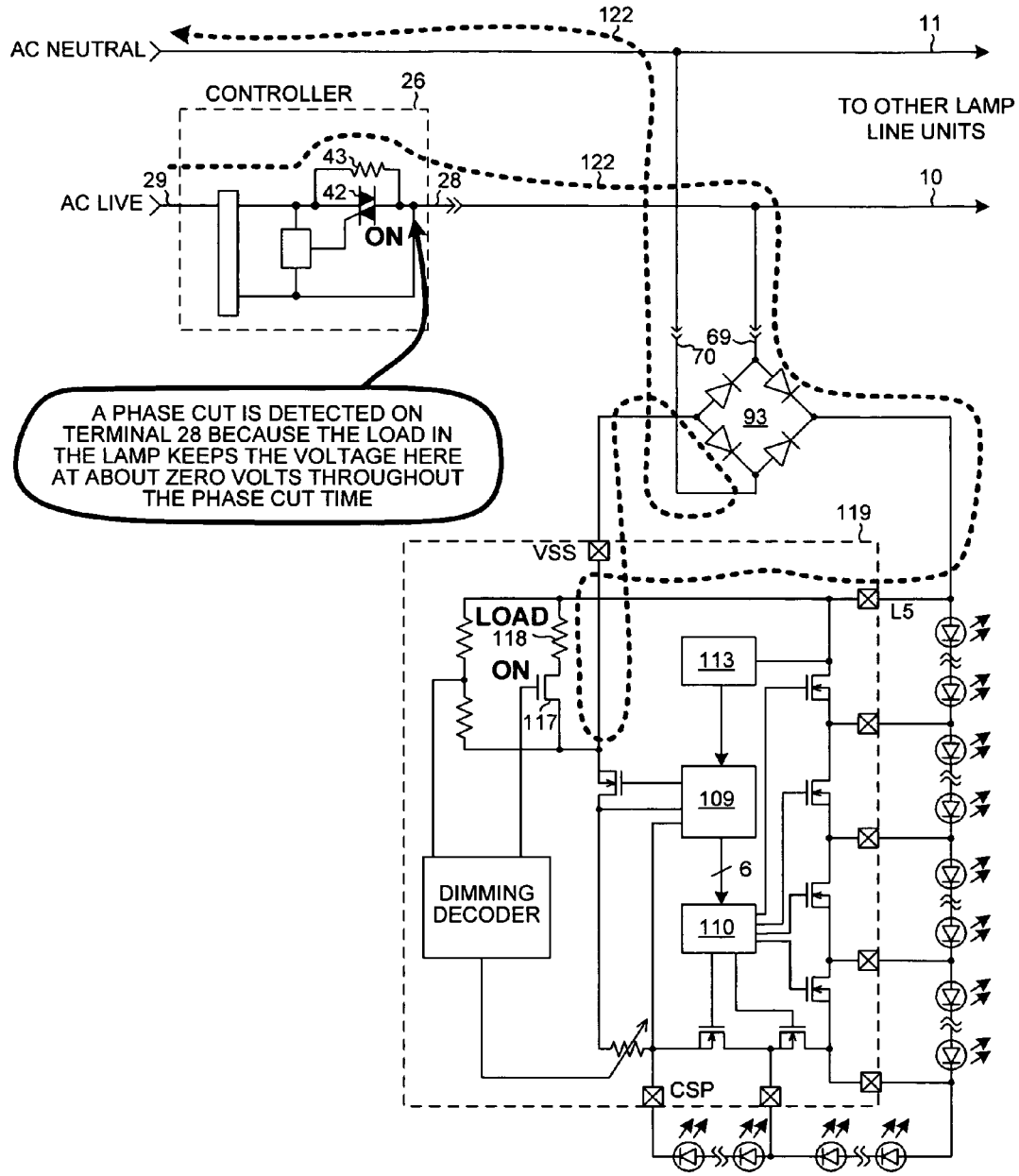
FIG. 14 is a diagram that illustrates how an addressed line unit can report back a digital "1" bit in response to receiving a report back command.

Within the addressed lamp, if dimming decoder 114 is to communicate a digital "1" bit back to controller 26, then dimming decoder 114 controls switch 117 to be conductive during the appropriate phase cut time. Switch 117 being conductive leaves load resistance 118 electrically connected between nodes 101 and 102 of the bridge rectifier. FIG. 14 illustrates the current path 122 through conductive switch 117 in the addressed lamp. The approximately zero voltage on terminal 28 of the controller 26 is detected by the microcontroller 53 and determined to be a digital "1".

Figure 15:
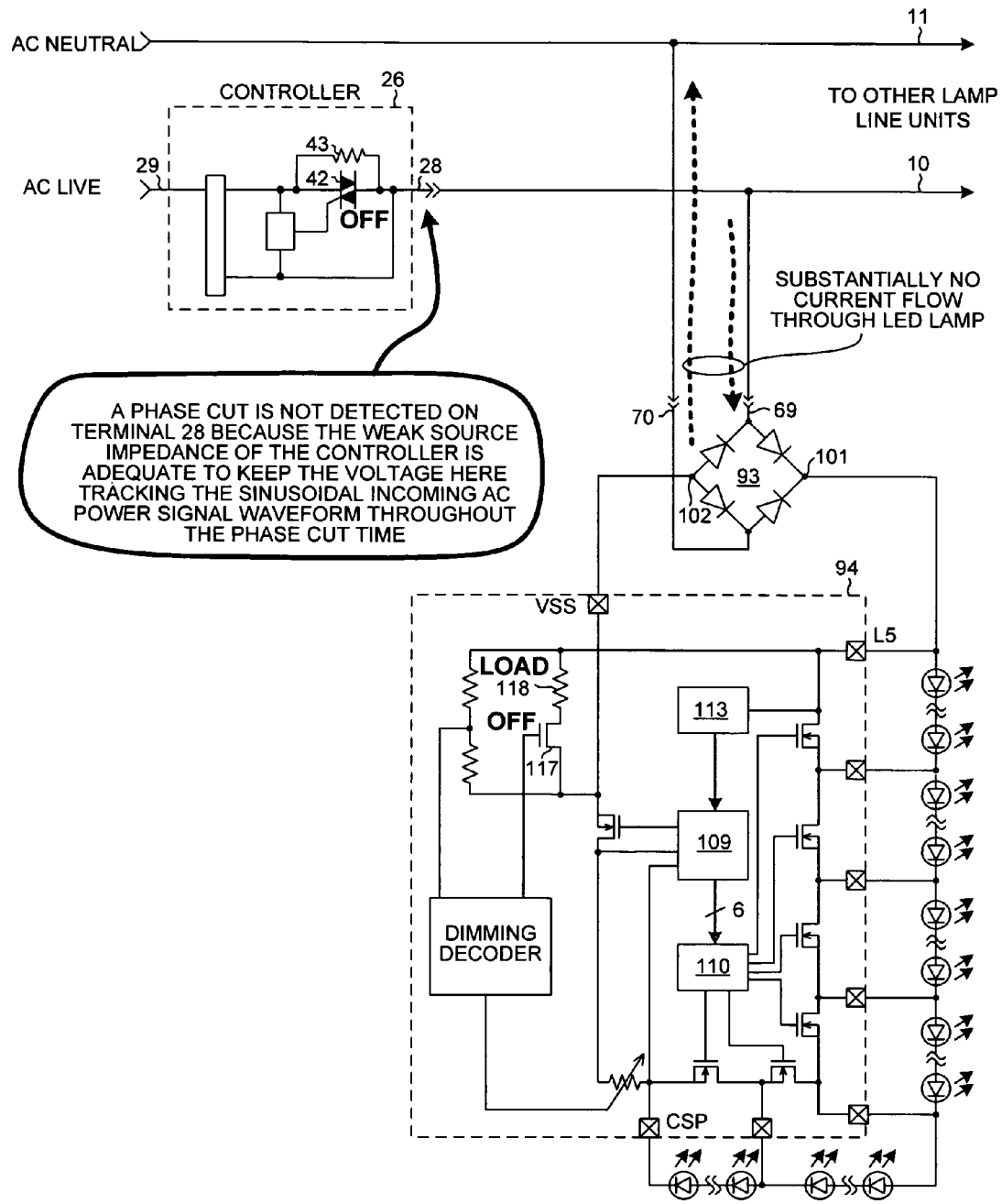
FIG. 15 is a diagram that illustrates how an addressed line unit can report back a digital "0" bit in response to receiving a report back command.

Within the addressed lamp, if dimming decoder 114 is to communicate a digital "0" bit back to controller 26, then dimming decoder 114 controls switch 117 to be nonconductive during the appropriate phase cut time. As illustrated in FIG. 15, there is substantially no current flow through the addressed lamp. The voltage on terminal 28 of the controller 26 is therefore seen to track the sinusoidal wave shape of the AC power signal on AC live terminal 29 due to the weak coupling provided by resistor 43. The nonzero voltage on terminal 28 of the controller 26 is detected by the microcontroller 53 and is determined to be a digital "0".

Figure 16:
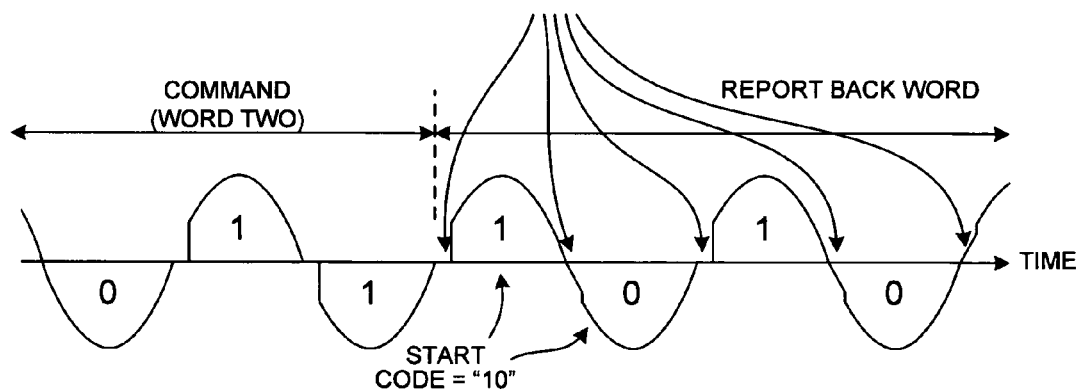
FIG. 16 is a waveform diagram that illustrates how the lamp line unit that is reporting back using load modulation changes the waveform shape on terminal 28 of the controller.

FIG. 16 is a waveform diagram of the AC power signal on conductor 10 and terminal 28 during a report back operation. After the second word of the two-word report back command, a 13-bit report back word is communicated. The report back word, like the other words, includes two start bits, ten payload bits, and one odd parity bit. The addressed lamp selectively loads or does not load conductor 10 during the phase cut times of the next thirteen half cycles. The controller 26 turns TRIAC 42 on and thereby drives the conductor 10 with the AC power signal at all times other than the phase cut times of the thirteen half cycles. During the phase cut times of these thirteen half cycles, the TRIAC 42 is controlled to be off. Because TRIAC 42 is off, the AC power signal from AC live input terminal 29 can only weakly drive terminal 28 and conductor 10 via the resistance of resistor 43.

Figure 17:
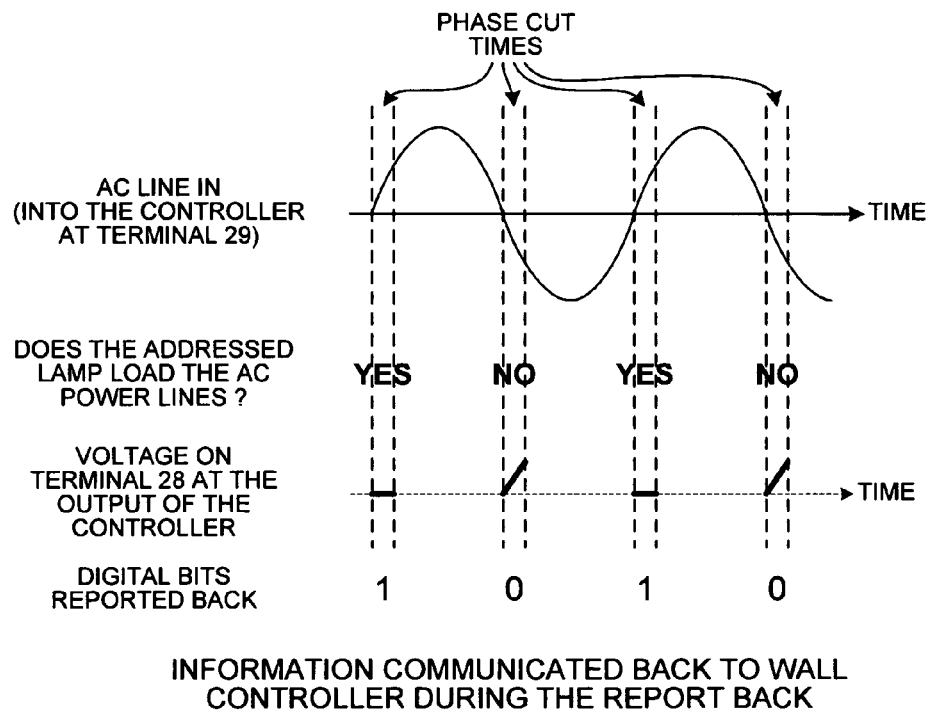
FIG. 17 is a waveform diagram that illustrates how the voltage on terminal 28 at the output of the controller changes in response to load modulation by the addressed and reporting lamp line unit.

FIG. 17 is a waveform diagram that shows the voltage across resistor 43 in the controller. In one embodiment, microcontroller 53 monitors this voltage during the phase cut times of the thirteen report back half cycles using the voltage divider involving resistors 48 and 49. To prevent unwanted loading of conductor 10 during the phase cut times of these report back half cycles (following a report back command), all of the lamps 36-41 detect the report back command and respond by suspending current flow through their LED strings during the phase cut times of the report back, cycles. Even though the lamps are off during these phase cut times, flicker is minimal because the report back command is used infrequently, and because the report back word is of a relatively few number of bits, and because the phase cut time is only about thirty degrees of a sixty hertz AC cycle.

Figure 18:
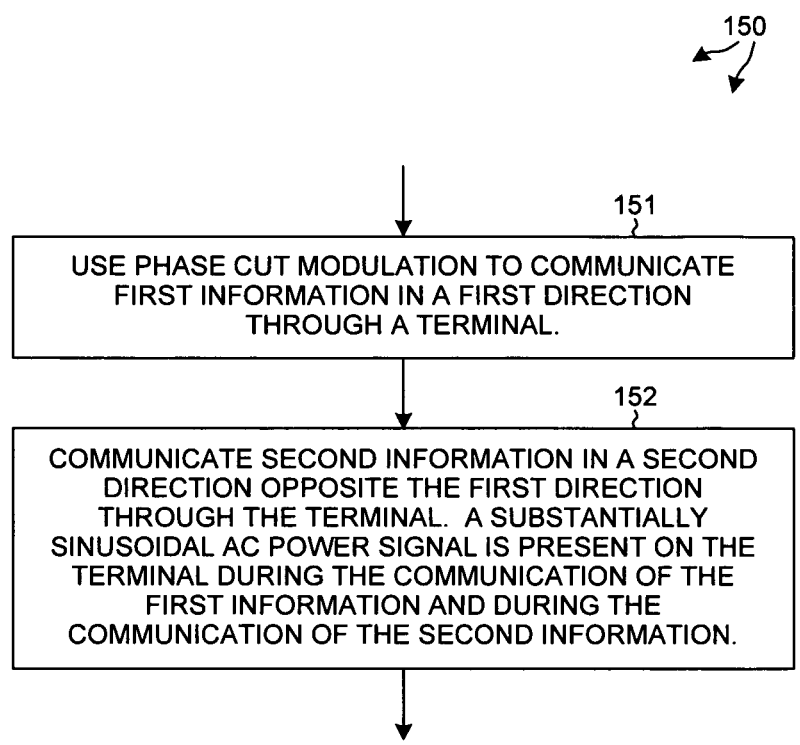
FIG. 18 is a flowchart of a method 150 in accordance with one novel aspect.

FIG. 18 is a flowchart of a method 150 in accordance with one novel aspect. In a first step (step 151), phase cut modulation is used to communicate first information in first direction through a terminal. In a first example, the terminal is terminal 28 of the controller 26 of FIG. 4 and the first information is identified by reference numeral 67. The first information is communicated out of controller 26. In a second example, the terminal is terminal 69 of lamp 36 and the first information is identified by reference numeral 67. The first information 67 is communicated into lamp 36 via terminal 69. In a second step (step 152), second information is communicated in a second direction opposite the first direction through the terminal. In the first example, the second information is identified by reference numeral 68 in FIG. 4. The second information 68 is load modulated and passes through terminal 28 and onto controller 26. In the second example, the second information is identified by reference numeral 68. The second information 68 is load modulated and passes out of lamp 36 through terminal 69. During the times when the first and second information are being communicated, there is a substantially sinusoidal AC power signal present on the terminal.

Group Operation

Although all the lamps 36-41 are connected in parallel to only one pair of conductors 10 and 11, each lamp can nevertheless be individually programmed so that it operates either in response to first paddle switch 31 and first slider 33 or in response to second paddle switch 32 and second slider 34. The lamp is associated with a switch/slider pair by causing the lamp to be loaded with a group address that identifies the switch/slider pair. If the user manipulates first paddle switch 31 or first slider 33 indicating that the user wants to turn on, to turn off, or to change the brightness level of the lamps of the first group, then controller 26 uses phase cut modulation to send an appropriate command to all the lamps. This command includes the group address for the first group 123. If a lamp receives a command that includes a group address for the first group, and if the group address matches the group address stored in the lamp, then the lamp will respond to the command along with all other lamps that store the group address for the first group. In a like manner, if the user manipulates second paddle switch 32 or second slider 34 indicating that the user wants to turn on, to turn off, or to change the brightness level of the lamps of the second group 124, the controller 26 uses phase cut modulation to send an appropriate command to all the lamps. This command includes the group address for the second group. If a lamp receives a command having a group address for the second group, and if the group address matches the group address stored in the lamp, then the lamp will respond to the command along with all other lamps that store the group address for the second group.

Whether an individual lamp is associated with the first paddle switch 31 and first slider 33 or is associated with the second paddle switch 32 and second slider 34 is determined by the user. In the diagram of FIG. 4, there are three lamps 36-38 that are to be controlled by switch 31 and slider 33. These lamps 36-38 are in first group 123. There are also three lamps 39-41 that are to be controlled by switch 32 and slider 34. These lamps 39-41 are in second group 124.

Figure 19:
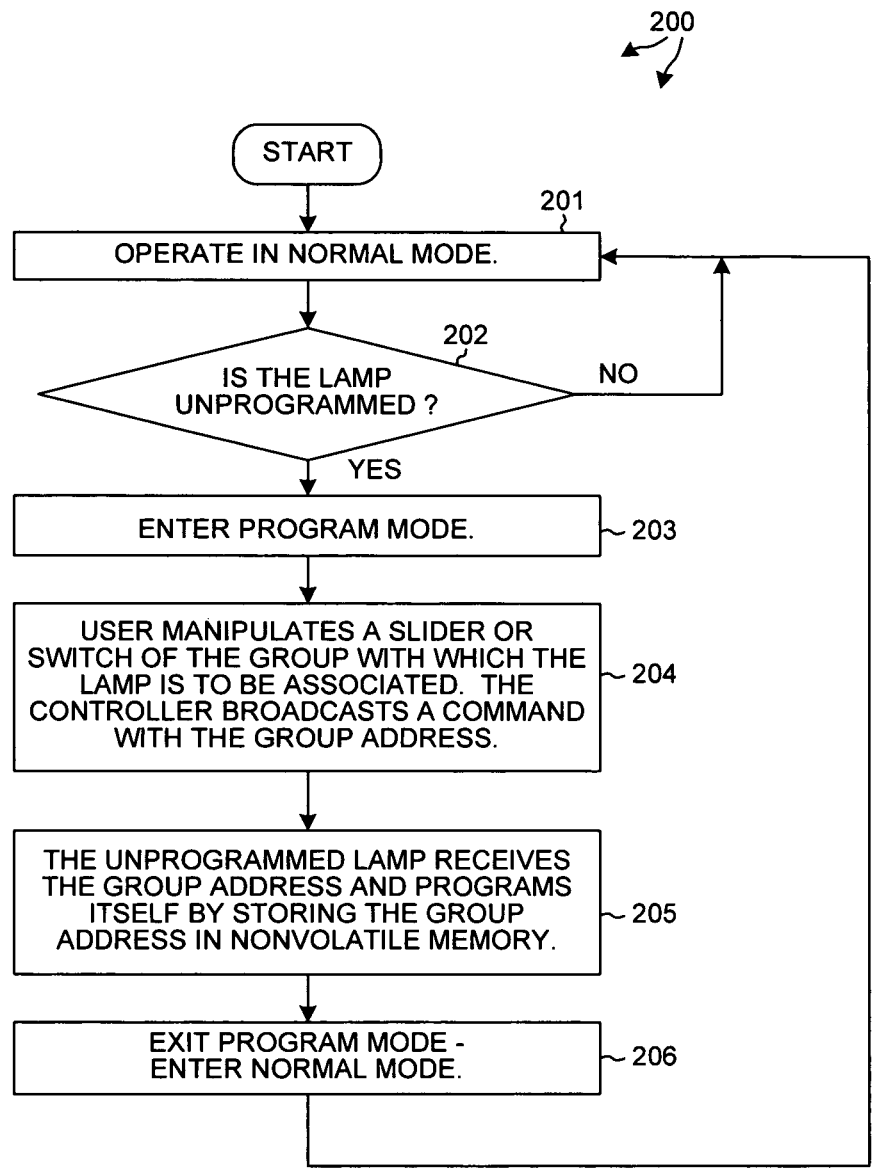
FIG. 19 is a flowchart of a method 200 for programming an unprogrammed lamp line unit to be associated with a group address.

FIG. 19 is a flowchart of a method 200 of associating a previously unprogrammed lamp with either the first paddle switch and first slider or the second paddle switch and second slider. The term "unprogrammed" here means that the lamp has not been made to store a group address. Initially, one new lamp that has not been previously programmed with a group address is coupled to conductors 10 and 11. The new lamp may, for example, be screwed into an accommodating empty socket for a bulb in the lighting system. When the lamp powers up for the first time due to AC power being received onto the lamp via conductors 10 and 11, the new lamp operates in a normal mode (step 201) and determines whether it has been programmed to store a group address. If the lamp has not been programmed to store a group address (step 202), then the lamp enters a program mode (step 203) and waits to receive a broadcast command. The broadcast command is a command addressed to all lamps, regardless of their addresses or group addresses. While the new lamp is waiting, the user manipulates a slider or paddle switch that the user wishes to be used later to control the lamp (step 204). Controller 26 responds by sending a command that contains the group address for the paddle switch or slider that was manipulated by the user. The unprogrammed lamp receives the command that carries the group address and programs itself by storing the group address in nonvolatile memory. Block 125 in the dimming decoder 114 in the LED lamp regulator IC 94 of FIG. 13 represents the stored group address. Thereafter the lamp uses this stored group address to determine whether it should respond to commands. Once programmed, the lamp exits (step 206) the program mode and enters the normal mode. The user can then add another new unprogrammed lamp to the system and program that new lamp. In this way, the user can program each lamp of the system one at a time to respond to the switch/slider for the first group 123 or to respond to the switch/slider for the second group 124.

Figure 20:
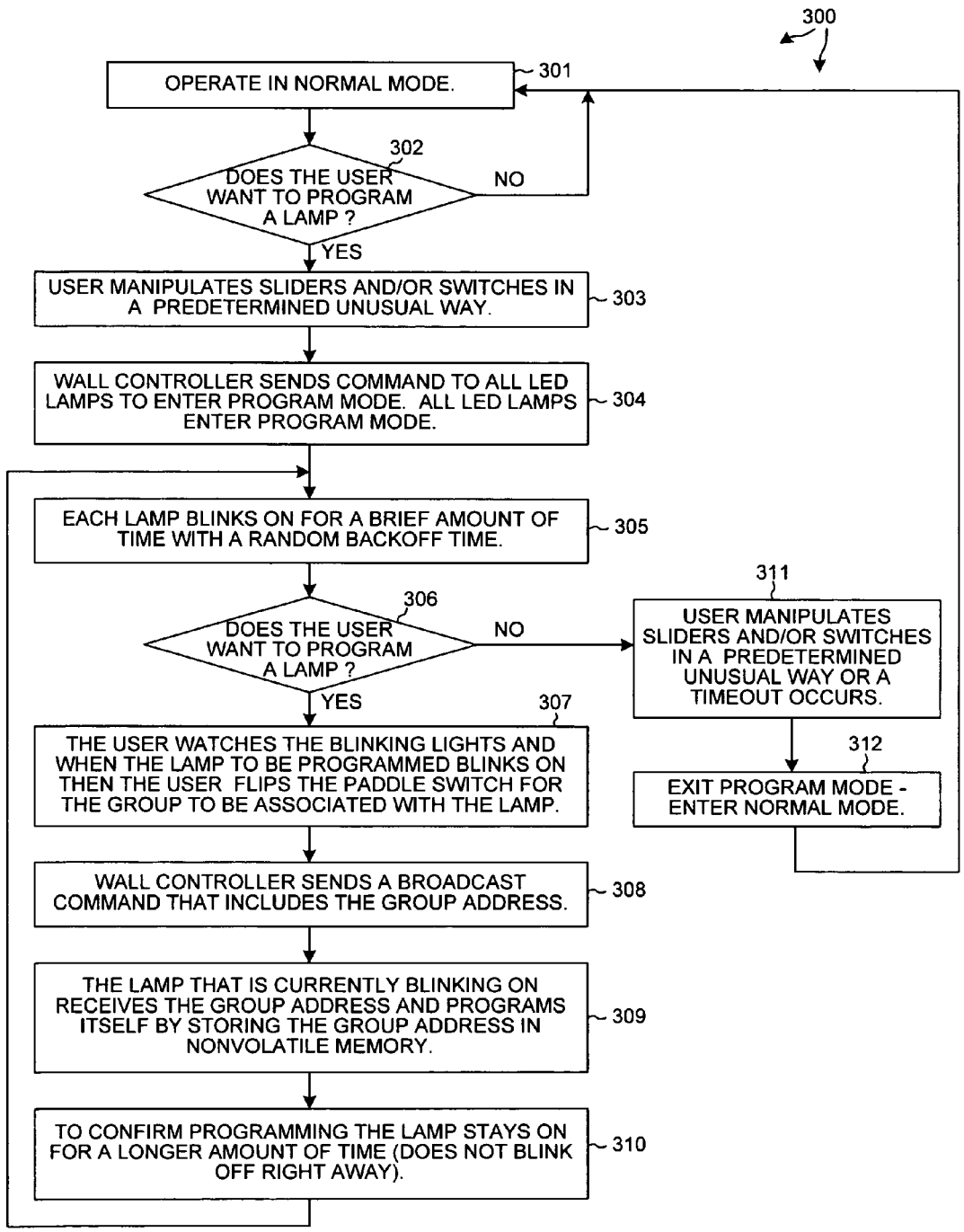
FIG. 20 is a flowchart of a method 300 for reprogramming a lamp line unit to be associated with a group address.

FIG. 20 is a flowchart of a method 300 for reprogramming a selected lamp so that the reprogrammed lamp can be controlled by a desired paddle switch and slider. The lamps of the system initially operate in a normal mode (step 301). If the user wants to program a lamp (step 302), then the user manipulates the sliders and/or switches in a predetermined unusual way. Controller 26 detects this predetermined and usual manipulation of its switches and/or sliders and responds by sending a broadcast command to all lamps to enter a program mode (step 304). When the lamps enter the program mode, each lamp blinks on for a brief amount of time (step 305) with a random backoff time. When a lamp is blinking it can be programmed. If the user wants to program a particular lamp (step 306), then the user watches the blinking lamps and when the lamp to be programmed begins blinking then the user flips the paddle switch that the user wishes to be associated with the lamp (step 307). The controller 26 detects this manipulation of the paddle switch, determines the group address associated with that switch, and sends (step 308) a broadcast command that includes the group address. The lamp that is currently blinking receives the group address and programs itself (step 309) by storing the group address in nonvolatile memory. Other lamps that are not blinking do not program themselves with the group address. To confirm programming, the recently programmed lamp then stays on (step 310) for a longer amount of time (does not blink off right away). After the longer amount of time, the lamp is turned off, and processing returns to step 305 so that the user can program another lamp of the system. If the user does not want to program another lamp (step 306), then the user manipulates the sliders and/or switches in a predetermined unusual way (step 311). The controller detects the unusual manipulation of step 311, and responds by sending out a broadcast command (step 312) for all lamps to exit the program mode and to enter the normal mode.

Identifying Unprogrammed Line Units

Rather than the user having to look for blinking lamps to identify an unprogrammed lamp to be programmed, in another method the controller steps through the unprogrammed lamps one at a time in order of lamp address. The controller puts the unprogrammed lamp with the lowest address into program mode first such that the lamp is on and all other lamps are off. The user can then manipulate the switch/slider to be associated with the unprogrammed lamp. In response, the controller sends a command to the addressed lamp where the command has the group address associated with the particular switch/slider the user manipulated. As in the method above, the addressed lamp receives the group address and stores it in nonvolatile memory. This lamp is then said to be programmed. The controller then puts the unprogrammed lamp with the next lowest address into programmed mode and repeats the programming steps. When there are no more unprogrammed lamps, the system operates in normal mode.

The controller initially learns of the addresses of the unprogrammed lamps using a report back query command. A report back query command is identified by an opcode of "11" (in the opcode field of the first command word) and a value (in the value field of the second command word) that identifies the report back command as a report back query command. To identify the unprogrammed lamp with the lowest address, the controller sends out a report back query command to all unprogrammed lamps to report back if certain bits in their addresses have certain values. A lamp reporting back will load the power conductors during a phase cut time. Multiple lamps may report back. In this example, the controller cannot determine whether just one lamp has reported back or whether multiple lamps have reported back.

The address identification method starts considering the Most Significant Bit (MSB) address bit. The controller sends out a report back query command for all unprogrammed lamps to report back whose MSB address bit is a "0". If there is a report back, then the controller has determined that there is at least one lamp whose MSB is a "0". If there is no report back, then the controller sends out a report back query command for all unprogrammed lamps to report back whose MSB is a "1". If there is a report back, then the controller has determined that there is at least one unprogrammed lamp whose MSB is a "1". The controller is engaged in identifying the unprogrammed lamp having the lowest address, so the controller determines the MSB address bit value to be the smallest value for which there was a report back.

Next, the controller sends out a report back query command for any unprogrammed lamp to report back whose MSB has the determined value but whose next most significant bit is a "0". Focus is now on the second most significant address bit. If there is a report back, then the controller has determined that there is at least one lamp whose MSB is the previously determined value and whose next most significant bit is a "0". If there is no report back, then the controller sends out a report back query command to determine whether there is at least one lamp whose MSB is the previously determined value and whose next most significant value is a "1". The controller is attempting to identify the unprogrammed lamp having the lowest address, so the controller determines the second most MSB bit value to be the smallest value for which there was a report back.

This process repeats address bit by address bit until the controller has identified the unprogrammed lamp having the lowest address. This determined lowest address is then used to put the identified lamp into the program mode, to make the lamp illuminate so it can be identified by the user, and to program the lamp to be associated with a user-identified switch/slider. After programming, the lamp will no longer respond to the report back query command. The process of querying unprogrammed lamps set forth above is repeated, however, such that the unprogrammed lamp having the next lowest address is identified. This identified lamp is then programmed. This method is repeated until there are no more unprogrammed lamps.

Although bidirectional phase cut modulation is explained above in connection with a lighting control system for illustrative purposes, bidirectional phase cut modulation is not limited to use in lighting control systems but rather has general applicability. Line units having different functions can be made both to receive AC power and to communicate using the same two AC power conductors. In one example, a lamp at a remote location in the circuit is removed and is replaced with a motion sensor line unit. The controller then communicates with the motion sensor line unit using the bidirectional phase cut modulation techniques described above. In this way, the controller automatically discovers the identity and function of the new line unit. If the motion sensor line unit thereafter detects motion, the motion sensor line unit reports back this occurrence to the controller in response to the controller periodically interrogating the motion sensor unit. When the controller receives a report back indicating that the motion sensor has sensed motion, the controller controls the lamp line units in an appropriate way by sending out addressed commands to the lamp line units.

Although certain specific embodiments are described above for instructional purposes, the teachings of this patent document have general applicability and are not limited to the specific embodiments described above. The manual switch on the controller need not be a paddle switch, but rather may be any suitable type of manual switch including a traditional toggle switch, or a pushbutton, or a touch sensitive switch. Similarly, the manually operable mechanism on the controller for adjusting the brightness of the lights need not be a slider, but rather may be any suitable type of mechanism including a rotating knob or a set of push buttons or a lever/rocker mechanism whose position is monitored by the microcontroller of the controller. The controller need not be disposed in a wall box and need not be a wall controller, but rather may be located in another location. In some examples, the AC neutral conductors do not connect to the wall controller as in the example illustrated above, whereas in other examples the AC neutral conductor 8 from the wall connects to a first terminal on a filter in the wall controller and AC neutral conductor 11 connects to another terminal on the filter such that the overall AC neutral current path passes through the filter of the wall controller.

In one example, the controller is implemented in the same factor and along with a circuit breaker. The controller does not necessarily, however, have any manual switches but rather is used primarily to relay messages between line units and to log information. The controller/circuit breaker is installed in a breaker box to protect a non-switched circuit such as a simple circuit of wall plugs. Line units are then plugged into the wall plugs. In this way, a first line unit can load modulate information back to the controller/circuit breaker and the controller/circuit breaker can relay that information to the second line unit. Line units can be corded devices that communicate information (for example, power consumption information) back to the controller/circuit breaker for logging purposes. One of the corded devices can be personal computer.

In another example, the controller includes an X-10 communication functionality as well as the bidirectional phase cut modulation functionality described above. The controller and its associated line units form a bidirectional phase cut modulation network whose controller is in communication with another X-10 device. The other X-10 device is part of a larger X-10 network. In this way, the bidirectional phase cut modulation network can form as an extension of the X-10 network. The controller can be made to act as a bridge to translate X-10 information from the X-10 device into bidirectional phase cut modulation information for communication to the line units, and the controller can also be made to translate bidirectional phase cut modulation information from the line units into X-10 information for communication back to the X-10 device. Accordingly, various modifications, adaptations, and combinations of various features of the described embodiments can be practiced without departing from the scope of the invention as set forth in the claims.

What is claimed is:

1. A method comprising:
   (a) using phase cut modulation to communicate first information in a first direction through a terminal; and
   (b) communicating second information in a second direction through the terminal, wherein the second direction is opposite the first direction, wherein a substantially sinusoidal AC power signal is present on the terminal during (a) and (b), and wherein the second information is communicated in (b) using load modulation.

2. A method comprising:
   (a) using phase cut modulation to communicate first information in a first direction through a terminal; and
   (b) communicating second information using load modulation in a second direction through the terminal, wherein the second direction is opposite the first direction, wherein a substantially sinusoidal AC power signal is present on the terminal during (a) and (b), wherein the phase cut modulation of (a) involves selectively interrupting the AC power signal present on the terminal during a predetermined phase time of each period of a first plurality of periods of the AC power signal, and wherein the load modulation of (b) involves selectively setting a load electrically coupled to the terminal during the predetermined phase time of each period of a second plurality of periods of the AC power signal.

3. The method of claim 2, wherein (a) and (b) are performed by a device, wherein the device outputs the first information out of the device via the terminal in (a), wherein the device receives the second information onto the device via the terminal in (b), and wherein the load is not a part of the device.

4. The method of claim 2, wherein (a) and (b) are performed by a device, wherein the device receives the first information onto the device via the terminal in (a), wherein the device outputs the second information from the device via the terminal in (b), and wherein the load is a part of the device.

5. The method of claim 4, wherein the first information includes an address, wherein the device checks the address and only outputs the second information after determining that the address identifies the device.

6. The method of claim 2, wherein the AC power signal is interrupted during some of the predetermined phase times of the first plurality of periods of the AC power signal, and wherein the AC power signal is not interrupted during others of the predetermined phase times of the first plurality of periods of the AC power signal.

7. The method of claim 2, wherein the load has a first impedance during some of the predetermined phase times of the second plurality of periods of the AC power signal, wherein the load has a second impedance during others of the predetermined phase times of the second plurality of periods of the AC power signal, and wherein the impedance is selectively changed from predetermined phase time to predetermined phase time to modulate information onto the AC power signal.

8. A device comprising:
a first terminal;
a second terminal;
a TRIAC (triode for alternating current) that can be turned on to establish a current path through the device from the second terminal to the first terminal;
a manual switch; and
a control circuit that: 1) determines a position of the manual switch, 2) controls the TRIAC such that phase cut modulated information is output from the device via the first terminal during a first time period, and 3) demodulates information received onto the device via the first terminal during a second time period, and wherein a substantially sinusoidal AC power signal is present on the first terminal throughout the first and second time periods.

9. The device of claim 8, wherein the information received onto the device is load modulated information.

10. The device of claim 8, wherein the device is a light dimmer, wherein the second terminal is an AC live input terminal, and wherein the manual switch is taken from the group consisting of: a paddle switch, a toggle switch, a slider adjustable resistor, a rotating knob adjustable resistor, an adjustable resistor, a toggle switch, a push button, and touch sensitive switch.

11. A device comprising:
a white LED (Light Emitting Diode);
a first terminal;
a second terminal; and
a circuit that: 1) receives an AC power signal via the first and second terminals, 2) controls the white LED, 3) receives phase cut modulated information via the first and second terminals during a first time period, and 4) outputs modulated information via the first and second terminals during a second time period, wherein a substantially sinusoidal AC power signal is present between the first and second terminals throughout the first and second time periods, and wherein the information output via the first and second terminals is load modulated information.

12. A device comprising:
a white LED (Light Emitting Diode);
a first terminal;
a second terminal; and
a circuit that: 1) receives an AC power signal via the first and second terminals, 2) controls the white LED, 3) receives phase cut modulated information via the first and second terminals during a first time period, and 4) outputs modulated information via the first and second terminals during a second time period, wherein a substantially sinusoidal AC power signal is present between the first and second terminals throughout the first and second time periods, wherein the device is an LED lamp that is powered by the AC power signal, wherein the phase cut modulated information includes an address, and wherein the circuit checks the address and only outputs the modulated information after determining that the address identifies the device.

13. An apparatus comprising:
a terminal; and
means for communicating first information in a first direction through the terminal, wherein the first information is phase cut modulated information, wherein the means is also for communicating second information in a second direction through the terminal, wherein the second direction is opposite the first direction, wherein a substantially sinusoidal AC power signal is present on the terminal during the communication of the first information and during the communication of the second information, and wherein the second information is load modulated information.

\* \* \* \* \*